US 7,992,697 B2

(12) United States Patent
Vatin et al.

(10) Patent No.: US 7,992,697 B2
(45) Date of Patent: *Aug. 9, 2011

(54) FRICTION DEVICE FOR A CLUTCH, PARTICULARLY OF A MOTOR VEHICLE

(75) Inventors: Géraud Vatin, Rilhac Rancon (FR); Philippe Pineda, Brive la Gaillarde (FR); Pierre Dumas, Burgnac (FR); Valérie Tessier, Panazol (FR)

(73) Assignee: Valeo Materiaux de Friction Societe Par Actions Simplifiee, Limoges (FR)

( * ) Notice: Subject to any disclaimer, the term of this patent is extended or adjusted under 35 U.S.C. 154(b) by 640 days.

This patent is subject to a terminal disclaimer.

(21) Appl. No.: 11/597,137

(22) PCT Filed: Jun. 9, 2005

(86) PCT No.: PCT/FR2005/050432
§ 371 (c)(1),
(2), (4) Date: Nov. 20, 2006

(87) PCT Pub. No.: WO2006/000727
PCT Pub. Date: Jan. 5, 2006

(65) Prior Publication Data
US 2008/0060899 A1 Mar. 13, 2008

(30) Foreign Application Priority Data
Jun. 14, 2004 (FR) ...................... 04 51174

(51) Int. Cl.
*F16D 13/64* (2006.01)
*F16D 69/04* (2006.01)
(52) U.S. Cl. .................. 192/107 C; 192/52.6; 192/200

(58) Field of Classification Search ................ 192/52.6, 192/107 C, 200
See application file for complete search history.

(56) References Cited

U.S. PATENT DOCUMENTS

| 1,837,173 A | * | 12/1931 | Reed .................. 192/107 C |
| 1,862,991 A | * | 6/1932 | Vargha .................. 192/209 |
| 1,956,828 A | * | 5/1934 | Fink .................. 192/107 C |
| 2,059,158 A | * | 10/1936 | Wemp .................. 192/107 C |
| 2,324,913 A | * | 7/1943 | Daukus .................. 192/107 C |
| 2,380,835 A | * | 7/1945 | Goodwin .................. 192/107 C |
| 4,099,604 A | * | 7/1978 | Higgerson .................. 192/70.252 |
| 4,422,539 A | * | 12/1983 | Werner .................. 192/107 C |
| 4,529,079 A | * | 7/1985 | Albertson .................. 192/107 C |

(Continued)

FOREIGN PATENT DOCUMENTS

DE 12 10 686 B 2/1966

(Continued)

*Primary Examiner* — David D Le
*Assistant Examiner* — Terry Chau
(74) *Attorney, Agent, or Firm* — Berenato & White, LLC (57) ABSTRACT

The invention relates to a friction device for a clutch, particularly of a motor vehicle. The inventive friction device comprises first and second axially-spaced coaxial friction lining members which are defined by opposing friction faces. The device also comprises means for linking the two friction lining members which are solidly connected to one another. The first friction lining member is essentially ring shaped. The aforementioned linking means comprise linking tongue elements which are each equipped with a first end for solidly connecting to an inner edge of the first friction lining member and a second end for solidly connecting to the second friction lining member. Moreover, a deviation angle is provided between said first and second connecting ends, which can vary according to the axial spacing of the two friction lining member.

27 Claims, 4 Drawing Sheets

U.S. PATENT DOCUMENTS

| | | | |
|---|---|---|---|
| 5,076,409 A | | 12/1991 | Graton et al. |
| 5,137,133 A | * | 8/1992 | Graton et al. ............. 192/107 C |
| 5,662,199 A | * | 9/1997 | Chevallier ................. 192/107 C |
| 5,779,017 A | * | 7/1998 | Kleifges et al. ............. 192/52.6 |
| 6,161,670 A | * | 12/2000 | Doremus et al. ......... 192/70.252 |
| 7,607,525 B2 | * | 10/2009 | Vatin et al. ................ 192/107 C |

FOREIGN PATENT DOCUMENTS

| | | |
|---|---|---|
| DE | 15 75 983 A | 2/1970 |
| DE | 33 20 977 C | 12/1984 |
| DE | 43 00 665 A | 9/1993 |
| FR | 2 255 499 A | 7/1975 |
| GB | 2044864 A * | 10/1980 |

* cited by examiner

FRICTION DEVICE FOR A CLUTCH, PARTICULARLY OF A MOTOR VEHICLE

BACKGROUND OF THE INVENTION

1. Field of the Invention

The present invention concerns a friction device for a clutch, in particular for a motor vehicle.

2. Description of the Related Art

A motor vehicle clutch is intended to transmit a torque between the engine flywheel of a motor vehicle and the gearbox input shaft. To this end, the clutch comprises a mechanism, rotationally fixed to the engine flywheel, and a friction device rotationally fixed to the gearbox shaft.

The mechanism comprises a pressure plate and a reaction plate, intended to cooperate with first and second friction linings of the friction device. These friction linings are carried by at least one support, normally of general form of revolution.

The friction device must achieve a compromise between various technical constraints.

On the one hand, it is necessary to limit the weight and inertia of the friction device.

To this end, it is wished to limit the dimensions of the friction linings, for example the thickness and the radial width of these friction linings. It is also wished to avoid the presence of rivets fixing the linings to their support, opting as far as possible for adhesive bonding of these linings to their support.

On the other hand, it is necessary to be able to activate the clutch progressively.

To this end, it is wished to incorporate elastic means, in general an elastomer mass, in the friction device, in order to ensure this progressiveness.

Shearing effects limit the possibilities of arranging the elastomer mass between a lining and its support.

A friction device for a clutch, in particular for a motor vehicle, has therefore been proposed in the prior art, in particular in EP-A-0 419 329, of the type comprising:
first and second friction lining members, coaxial, separated axially, delimited by opposite friction faces, and
means of connecting the two friction lining members fixed together.

In a friction device of this type, the friction lining members each comprise a support carrying a friction lining. In this case, the elastomer mass is interposed between the first and second supports.

More particularly, each lining support described in EP-A-0 419 329 comprises a peripheral part, annular in shape overall, and a central part connecting with the other lining support. The central parts of the supports are contiguous. The peripheral parts of the supports, separated axially from each other, are connected to the central parts by intermediate parts converging from these peripheral parts towards these central parts.

Because of this, when the friction linings are clamped between the pressure and reaction plates, the peripheral parts of the lining supports deform, diverging towards the intermediate parts of the axially relatively rigid supports. Consequently the separation between the peripheral parts of the lining supports does not vary uniformly radially, when the friction linings are clamped between the pressure and reaction plates.

As a result the friction linings do not cooperate uniformly radially with the pressure and reaction plates, which impairs the performance of the clutch.

SUMMARY OF THE INVENTION

The aim of the invention is in particular to propose a friction device provided with friction lining supports moving substantially parallel with respect to each other when they are acted on by the pressure and reaction plates.

To this end, the object of the invention is a friction device of the aforementioned type, where the first friction lining member has a general annular shape, the connection means comprising connection tongues each provided with a first end for fixing to an internal contour of the first friction lining member and a second end for fixing to the second friction lining member, the first and second fixing ends having an angular offset between them as a function of the axial separation of the two friction lining members.

These connection tongues enable the friction lining members to move with respect to each other substantially by screwing along a rotation center axis of the supports (it will be recalled that screwing along an axis is a simultaneous combination of a rotation on this axis and a translation parallel to this same axis). Thus, when the axial separation of the friction lining members increases, the angular offset between the fixing ends of each tongue decreases, and when the axial separation of the friction lining members decreases, the angular offset between the fixing ends of each tongue increases.

By virtue of these connecting tongues, the friction lining members remain substantially parallel to each other when they are acted on by the pressure and reaction plates.

A friction device according to the invention can also comprise one of more of the following characteristics:
the connecting tongues are bent so that their first and second fixing ends are mutually offset axially;
the bent connecting tongues are carried by the friction lining member intended to cooperate with the pressure plate axially;
the first connecting end of each connecting tongue is made in one piece with the first friction lining member;
the first fixing end of each connecting tongue is attached to the first friction lining member;
it is possible to define, on each connecting tongue of the support, a top angular sector coinciding substantially with the second fixing end of this tongue and extending as far as an external contour of the support without any interruption of material, the angular sector forming an angle between 10° and 35°, and where an axis perpendicular to a radius passing through the center of the device is included in the said angular sector;
the connecting tongues are disposed in two opposite circumferential directions, in particular in the form of a V;
the second friction lining member has a generally annular shape and comprises connecting tongues each provided with a first end for fixing to an internal contour of this second friction lining member and a second end for fixing to the second fixing end of a corresponding connecting tongue of the first friction lining member, the first and second fixing ends of the connecting tongues of the second friction lining member having a mutual angular offset;
the friction device comprises elastic means for axial bracing of the first and second friction lining members;
the elastic bracing means comprise an elastomer mass, preferably generally annular in shape, arranged between the first and second friction lining members;
the bracing means comprise elastic bracing tongues each provided with a first end for fixing to one of the friction lining members and a second end free from contact with the other one of the friction lining members, these bracing tongues being bent so that their first and second ends are mutually offset axially;

the elastic bracing tongues are connected to only one of the friction lining members carrying a lining intended to cooperate preferably with an axially movable pressure plate;

the friction device comprises at least two bracing tongues having different axial offsets between their first and second ends;

the friction device comprises at least two bracing tongues having different stiffnesses;

the friction device comprises at least one two bracing tongues, referred to as matched tongues, connected respectively to the first and second friction lining members;

the matched bracing tongues are substantially symmetrical with respect to a plane parallel to the first and second friction lining members;

the matched bracing tongues are substantially symmetrical with respect to a point;

the symmetry point is a point of contact between the matched bracing tongues;

the matched bracing tongues are provided with mutual contact surfaces, the contact surface on one matched tongue being opposite the friction lining member to which it is connected;

the matched bracing tongues are provided with mutual contact surfaces, the contact surface on one matched tongue being opposite the friction lining to which it is not connected;

the connecting tongues and the bracing tongues extend from their first end to their second end respectively in identical circular directions;

the friction device comprises a device for taking up wear on the linings;

the distance between the first and second connecting ends on each connecting tongue is between 5 and 60 mm, preferably between 20 and 40 mm;

at least one of the friction lining members comprises a support carrying a friction lining;

the friction lining is adhesively bonded to the support, the said support is generally made from steel, but it is also possible to produce it from composite material. When the lining is bonded to a support, the latter is generally in the form of a continuous ring, but it can also consist of separate annular segments, even separated from each other;

at least one friction lining member is formed in a single piece, for example injection moulded.

It should be noted that the connecting means of the two friction lining members can make it possible either to affix them together directly with contact (this thus means that the securing end is a connecting end), or indirectly with the presence of an intermediate piece between the two friction lining members.

According to one embodiment, the intermediate piece is a flange, in particular a guidance washer rotationally fixed to the gearbox shaft.

It should be noted that, by virtue of the invention, which makes it possible to optimize the contact of the friction linings with the pressure and reaction plates, it is possible to reduce the radial width of these linings more than in the prior art.

Thus another object of the invention is a friction lining for a friction clutch device, in particular for a motor vehicle, annular in shape overall, the ratio between the radial width of the lining and the outside diameter of the lining is less than 0.10, or even less than 0.095.

BRIEF DESCRIPTION OF THE DRAWINGS

The invention will be better understood from a reading of the description that follows, given solely by way of example and made with reference to the accompanying drawings, in which.

DETAILED DESCRIPTION OF THE PREFERRED EMBODIMENTS

Figure 1:
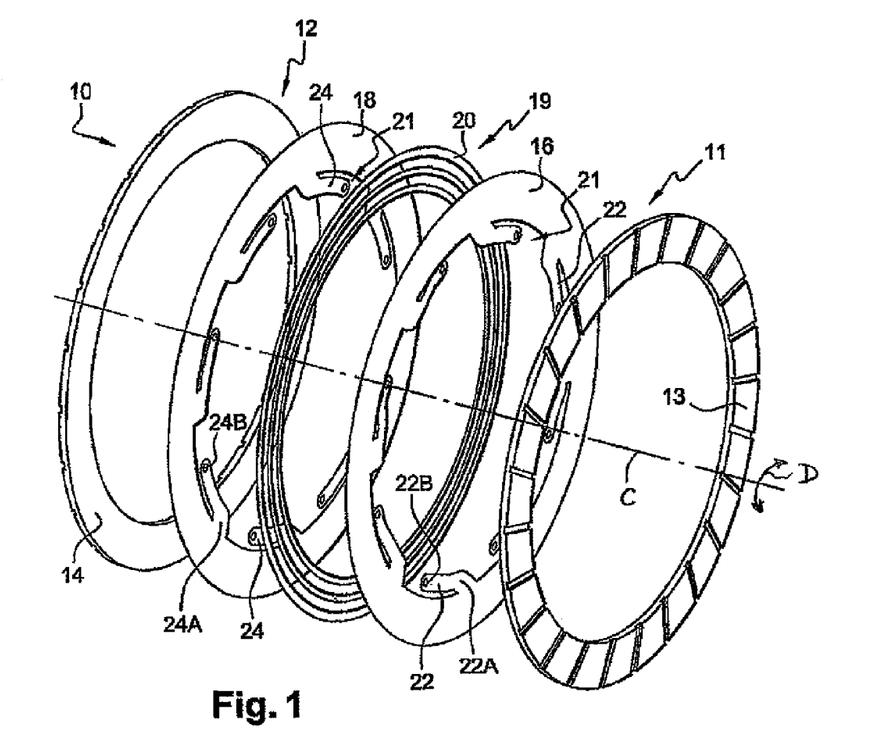
FIG. 1 is an exploded view of a friction device according to a first embodiment of the invention.

FIG. 1 depicts a friction device for a clutch, in particular for a motor vehicle. This friction device is designated by the general reference 10.

The friction device 10 comprises first 11 and second 12 friction lining members, substantially annular and coaxial to a center axis C thereof.

The first 11 and second 12 friction lining members comprise respectively first 13 and second 14 friction linings, delimited by opposite friction faces, intended respectively to cooperate with a pressure plate and a reaction plate (not shown) fixed to an engine flywheel (not shown) for rotation about the center axis C.

The first 11 and second 12 friction lining members also comprise respectively first 16 and second 18 supports, fixed to a gearbox shaft (not shown), to which the first 12 and second 14 friction linings are fixed, for example by adhesive bonding, for rotation about the center axis C. In a variant, at least one friction lining member is formed in a single piece, for example injection moulded.

The first 16 and second 18 supports are substantially annular and coaxial to the center axis C thereof, and separated axially from each other. In general, these first and second supports are made from composite material or steel preferably comprising 0.68% or 0.75% carbon (designated respectively XC68 and XC75 according to the French AFNOR standard).

It should be noted that, in order to ensure constant efficacy of the friction linings, the friction device 10 preferably comprises a wear take-up device (not shown) for the linings 13, 14.

The friction device 10 comprises elastic axial bracing means 19 for the first 16 and second 18 supports, intended to provide the progressiveness of the clutch. According to a first embodiment of the invention, the elastic bracing means 19 comprise an elastomeric member 20 preferably comprising three annular rings, substantially coaxial, arranged between the first 16 and second 18 supports.

Figure 2:
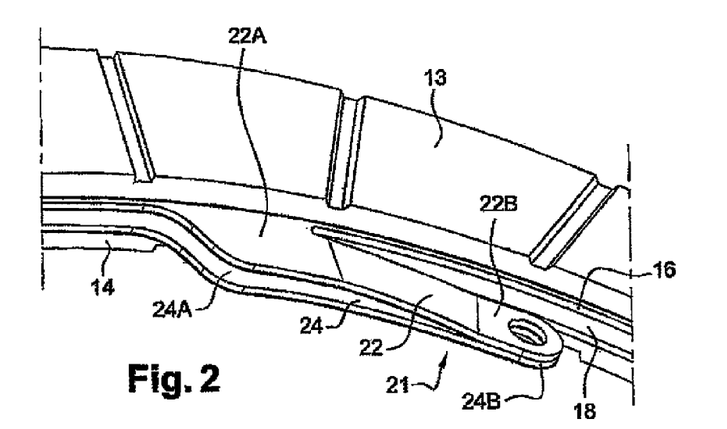
FIG. 2 is a perspective view of means of connecting two supports of the friction device according to the embodiment of the invention depicted in FIG. 1.

The friction device 10 also comprises means 21 of connecting the first 16 and second 18 supports together, depicted in more detail in FIG. 2.

The connecting means 21 comprise first connecting tongues 22, each provided with a single first end 22A for fixing to an internal contour of the first support 16, and second connecting tongues 24, each provided with a single first end 24A for fixing to the internal contour of the second support 18. As depicted in FIGS. 1 and 2, the first connection tongues 22 and the second connecting tongues 24 arranged so that each one of the first connection tongues 22 is axially aligned with one of the second connecting tongues 24 in the direction of the center axis C, and each of the first connection tongues 22, 24 extends from the first end 22A, 24A to the second end 22B, 24B thereof in the same circular direction about the center axis C.

In the example depicted in FIG. 1, the first fixing ends 22A, 24A of the tongues 22, 24 are made in one piece with the corresponding support 16, 18.

The connecting tongues 22 of the first support 16 are each provided with a single second end 22B for fixing to a single second fixing end 24B of one of the corresponding connecting tongues 24 of the second support 18.

It should be noted that the first 22A, 24A and second 22B, 24B fixing ends of each connecting tongues 22, 24 have a mutual angular (i.e., circumferential) offset between them with respect to a plane perpendicular to the center axis C (i.e., in a circumferential direction D around the center axis C), as depicted in FIGS. 1-5. Generally the distance between the first 22A (or respectively 24A) and second 22B (or respectively 24B) fixing ends of each connecting tongue 22 (or respectively 24) is between 5 and 60 mm, preferably between 20 and 40 mm.

Moreover, the connecting tongues 22 of the first support 16 are bent, so that their first 22A and second 22B fixing ends are mutually offset axially.

Thus, when the first 16 and second 18 supports move axially with respect to each, for example by gripping between the pressure plate and reaction plate, the first 16 and second 18 supports move, parallel with respect to each other, by screwing along their axis.

It should therefore be noted that the angular offset between the first 22A and second 22B fixing ends of the tongues 22 is variable according to the axial separation of the two supports 16, 18.

The invention permitting a substantially parallel movement of the first 16 and second 18 supports with respect to each other, the contact of the friction linings with the pressure and reaction plates is optimized.

Thus is it possible to use friction linings 13, 14 of reduced dimensions, preferably such that the ratio of their radial width to their outside diameter is less than 0.10 and/or such that their thickness is limited.

In a variant, it is also possible to use friction linings 13, 14 of dimensions adapted to radially overlap on the first fixing end 22A, 24A of the tongues 22, 24. In this way the connection between the tongues 22, 24 and their corresponding support 16, 18 is reinforced because of the connection by adhesive bonding between the tongues 22, 24 and the parts of the friction linings 13, 14 overlapping on these tongues 22, 24.

The tongues 22, 24 being acted on more than the supports 16, 18, it may be advantageous to produce these tongues 22, 24 from a steel other than that of the support 16, 18 and/or to confer a greater thickness on them, in order to increase their resistance to traction and/or buckling.

Figure 3:
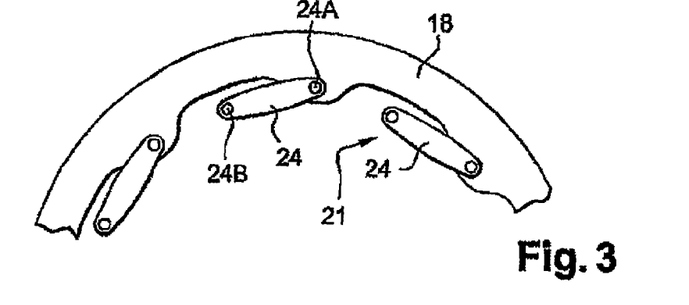
FIG. 3 is a partial front view of a first variant of a support of the friction device according to a first embodiment of the invention.

Thus, according to a first variant of the first embodiment of the invention, depicted in FIG. 3, the first fixing end 22A (or respectively 24A) of each connecting tongue 22 (or respectively 24) is attached, for example by riveting, to the corresponding support 16 (or respectively 18).

Figure 4:
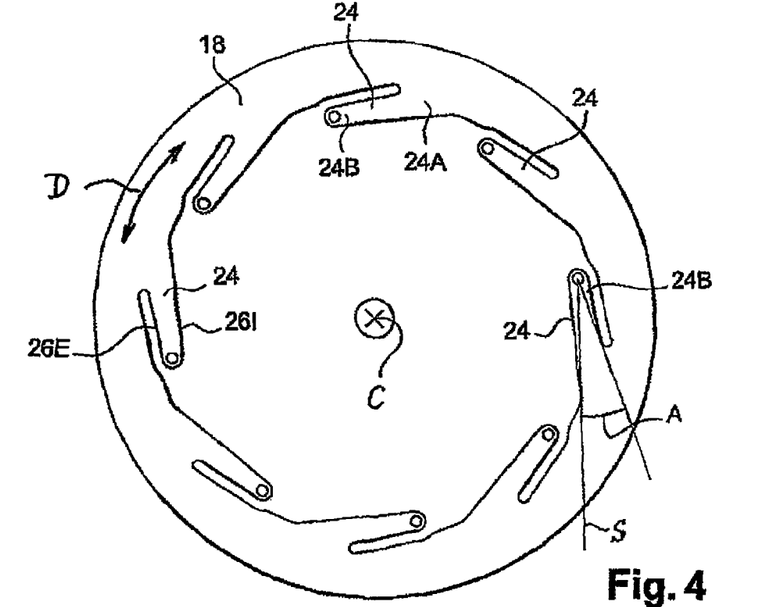
FIG. 4 is a front view of a second variant of a support of the friction device according to the first embodiment of the invention.

According to a second variant of the first embodiment, the connecting tongues 24 of the second support 18 have the appearance depicted in FIG. 4. Each connecting tongue 24 is delimited by two edges, radially external 26E and internal 26I respectively, diverging with respect to each other from the second end 24B towards the first end 24A of the connecting tongue 24.

It should be noted that it is possible to define, on each connecting tongue 24 of the second support 18, an angular sector A with a vertex coinciding substantially with the second end 24B of this tongue 24 and extending as far as the internal contour of the second support 18 without any interruption of material, with an angle of between 10° and 35°, where an axis S perpendicular to a radius passing through the center axis C of the friction device 10 is included in the angular sector A. The continuity of material in this angular sector optimizes the resistance of the connecting tongues 24 to the forces undergone by the first 16 and second 18 supports when they transmit a torque between the engine flywheel and the gearbox shaft.

The connecting tongues 22 of the first support 16 are similar to the connecting tongues 24 except that they are bent, unlike the connecting tongues 24.

Figure 5:
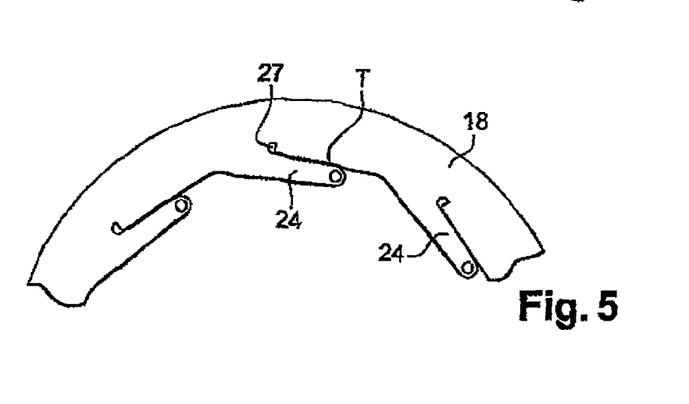
FIG. 5 is a partial front view of a third variant of a support of the friction device according to the first embodiment of the invention.

According to a third variant depicted in FIG. 5, each connecting tongue 24 is separated from the rest of the second support 18 by a cutting line T emerging in a stress distribution eye 27. The connecting tongues 22 of the first support 16 are similar to the connecting tongues 24 except that they are bent, unlike the connecting tongues 24.

Figure 6:
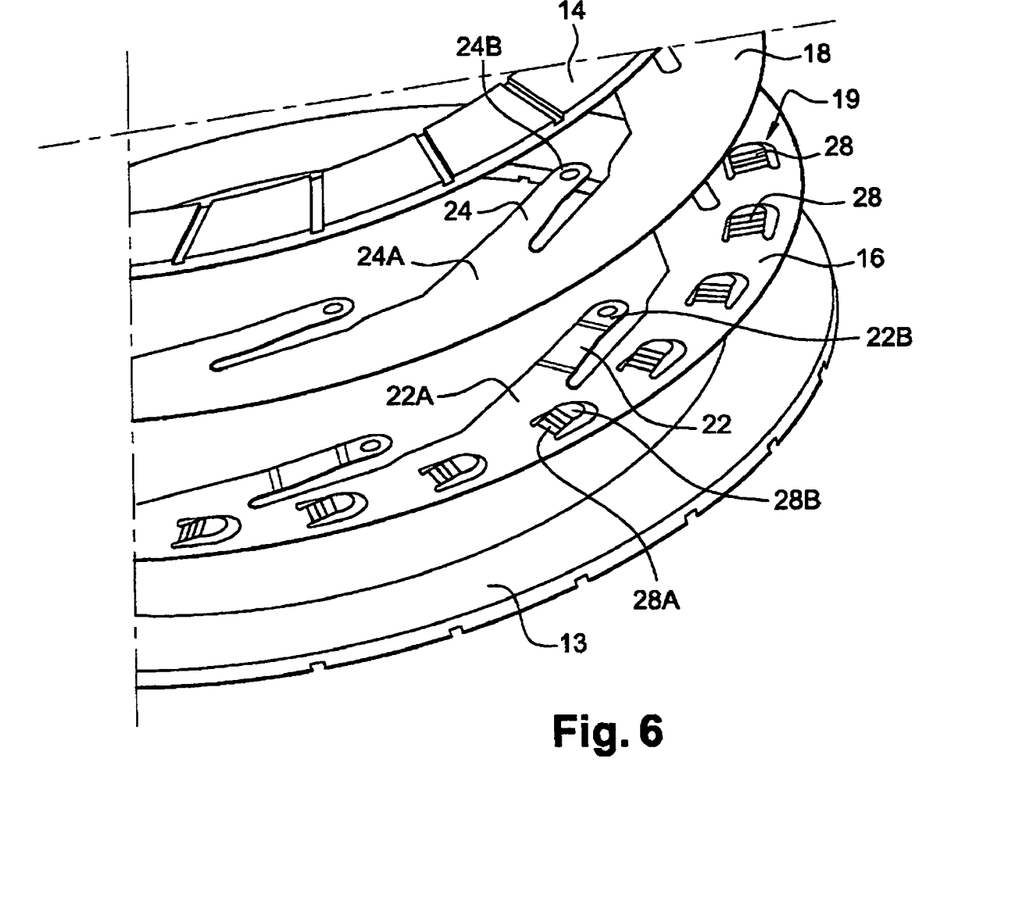
FIG. 6 is an exploded view of a friction device according to a second embodiment of the invention.
Figure 7:
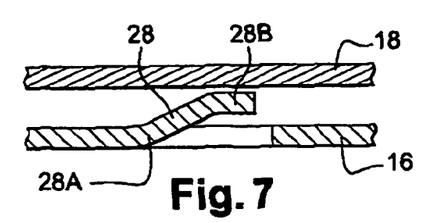
FIGS. 7 to 12 are schematic views in section respectively of two supports of the friction device depicted in FIG. 6 and of five variants of these supports.

FIGS. 6 and 7 depict a friction device according to a second embodiment of the invention. In these figures, the elements similar to those in the previous figures are designated by identical references.

According to this second embodiment, the bracing means 19 comprise elastic bracing tongues 28. These bracing tongues 28 are cut from the support 16 and are preferably disposed tangentially to a circle coaxial with the support 16. In a variant the bracing tongues can be disposed radially.

The elastic bracing tongues 28 are shown in more detail in FIG. 7.

Each elastic bracing tongue 24 is provided with a first end 26A for connection to the first support 16 and a second free end 28B. The bracing tongues 28 are bent so that their first 28A and second 28B ends are offset axially from each other. Thus the second end 28B of each bracing tongue 28 is able to come into contact with the second support 18, in particular when the first 16 and second 18 supports move towards each other, so as to ensure progressiveness of the clutch.

Preferably the connecting tongues 22 and the bracing tongues 28 each extend from their first end 22A, 28A towards their second end 22A, 28A in identical respective circular directions. Thus, when the first 16 and second 18 supports move axially with respect to each other, by screwing, the free ends 28B of the bracing tongues 28 that deform remain substantially fixed with respect to the second support 18.

Preferably also, the support 16 provided with the elastic bracing tongues 28 is the support carrying the lining 12 intended to cooperate with the pressure plate.

Figure 8:
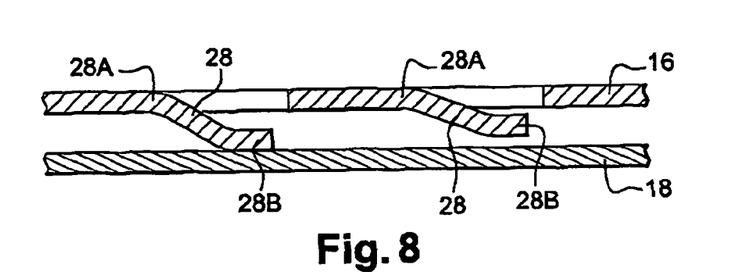

According to a variant depicted in FIG. 8, the support 16 comprises at least two bracing tongues 28 having different axial offsets between their first 28A and second 28B ends.

These tongues 28 can also have different stiffnesses. In this way it is possible to optimize the progressiveness of the clutch.

Some bracing tongues 28 can also be connected to the opposite support 18, for example by adhesive bonding, welding or snapping on. These bracing tongues 28, connected to the two supports 16, 18, make it possible, in addition to their progressiveness function, to limit the separation of these supports 16, 18.

FIGS. 9 to 12 depict four other variants of the second embodiment of the invention in which the first 16 and second 18 supports are each provided with at least one bracing tongue 28, 30. These tongues 28, 30, referred to as matched, are respectively connected to the first 16 and second 18 supports.

Figure 9:
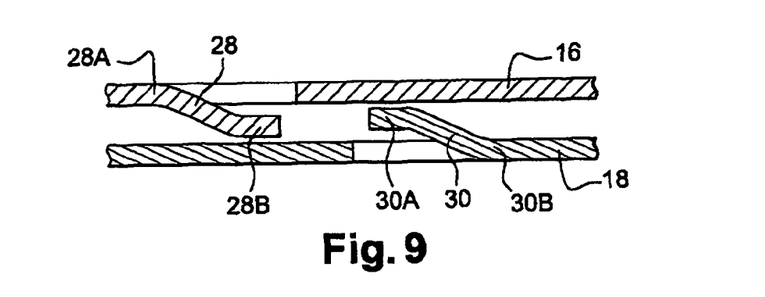

According to the variant depicted in FIG. 9, the free ends of the matched bracing tongues 28, 30 extend from their first end 28A, 30A towards their second free end 28B, 30B respectively in opposite circular directions.

Figure 10:
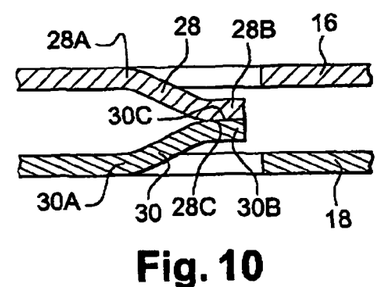

According to the variant depicted in FIG. 10, the free ends of the matched tongues 28, 30 are provided with mutual contact surfaces 28C, 30C, such that the contact surface of a matched tongue 28, 30 is opposite the support 18, 16 to which it is not connected. The matched bracing tongues 28, 30 are substantially symmetrical with respect to a plane parallel to the first 16 and second 18 supports.

Figure 11:
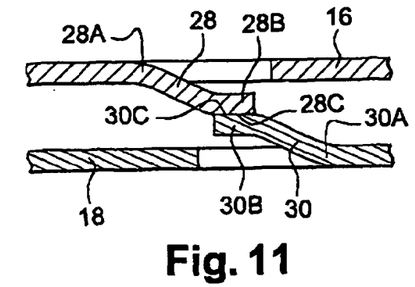

According to the variant depicted in FIG. 11, the free ends of the matched tongues 28, 30 are also provided with mutual contact surfaces 28C, 30C such that the contact surface of a matched tongue 28, 30 is opposite the support 18, 16 to which it is not connected. However, according to this variant, the bracing tongues 28 and 30 are substantially symmetrical with respect to a point of contact between the matched bracing tongues.

Figure 12:
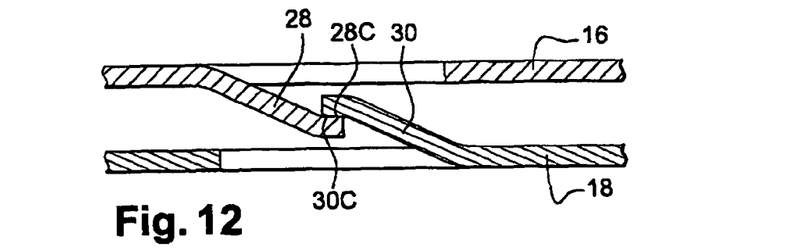

According to the variant depicted in FIG. 12, the free ends of the matched bracing tongues 28, 30 are provided with mutual contact surfaces 28C, 30C such that the contact surface of a matched tongue 28, 30 is opposite the support 16, 18 to which it is connected. Thus the matched tongues 28, 30 cooperate with each other so as to limit the separation of the supports 16 and 18.

Four examples of embodiments according to the invention have been manufactured and have made it possible to obtain very good resistance to centrifugation.

The linings are adhesively bonded to a metal support of approximately 0.3 mm made from XC 68 steel. In this way the presence of fixing rivets is avoided. The dimensions of the linings are set out in the following table:

| Outside diameter (mm) | Inside diameter (mm) | Radial width of lining (mm) | Radial width of the lining/outside diameter |
|---|---|---|---|
| 180 | 145 | 17.5 | 0.097 |
| 180 | 148 | 16 | 0.089 |
| 215 | 175 | 20 | 0.093 |
| 215 | 190 | 22.5 | 0.096 |

It is also found that the friction devices thus produced have a low overall inertia.

It should be noted that the invention is not limited to the embodiments previously described.

This is because it is for example possible to combine various characteristics of the different embodiments and/or of the different variants without departing from the scope of the invention.

The invention claimed is:

1. A friction device (10) for a clutch of a motor vehicle, comprising:
   first (11) and second (12) friction lining members, coaxial to a center axis (C) thereof, separated axially, and delimited by opposite friction faces; and
   connection means (21) connecting the two friction lining members (11, 12) fixed together;
   the first friction lining member (11) having a generally annular shape;
   the connection means (21) comprising first connection tongues (22) each provided with a first fixing end (22A) fixed to an internal contour of the first friction lining member (11) and a second fixing end (22B) fixed to the second friction lining member (12);
   the first (22A) and second (22B) fixing ends of each of the first connection tongues (22) being variably angularly offset from each other with respect to a plane perpendicular to the center axis (C) as a function of the axial separation of the first and second friction lining members (11, 12).

2. The friction device (10) according to claim 1, wherein the first connecting tongues (22) are bent so that their first (22A) and second (22B) fixing ends are mutually offset axially in the direction of the center axis (C).

3. The friction device (10) according to claim 2, wherein the first bent connecting tongues (22) are carried by the first friction lining member intended to axially cooperate with a pressure plate of the clutch.

4. The friction device (10) according to claim 1, wherein the first friction lining member (11) comprises a first annular support (16) and a first annular friction lining (13) fixed to the first support (16); and wherein the first fixing end (22A) of each of the first connecting tongues (22) is made in one piece with the first support (16).

5. The friction device (10) according to claim 1, wherein the first fixing end (22A) of each of the first connecting tongues (22) is attached to the first friction lining member (11).

6. The friction device (10) according to claim 1, wherein the first friction lining member (11) comprises a first annular support (16) and a first annular friction lining (13) fixed to the first support (16) and the second friction lining member (12) comprises a second annular support (18) and a second annular friction lining (14) fixed to the second support (18);
   wherein the connection means (21) further comprises second connecting tongues (24) each provided with a first fixing end (24A) fixed to an internal contour of the second friction lining member (12) and a second fixing end (24B) fixed to the first friction lining member (11);
   wherein on each of the first and second connecting tongues (22, 24) of the support(16, 18), a top angular sector (A) coinciding substantially with the second fixing end (22B, 24B) of each of the first and second connecting tongues (22, 24) and extending as far as an external contour of the corresponding first or second support (16, 18) without any interruption of material is defined;
   wherein the angular sector forms an angle between 10° and 35°; and wherein an axis perpendicular to a radius passing through the center axis of the friction device is included in the top angular sector (A).

7. The friction device (10) according to claim 1, wherein the second friction lining member (12) has a generally annular shape; and wherein the connection means (21) further comprises second connecting tongues (24) each provided with a first fixing end (24A) fixed to an internal contour of the second friction lining member (12) and a second fixing end (24B) fixed to the second fixing end (22B) of the corresponding first connecting tongue of the first friction lining member (11) so that the first (24A) and second (24B) fixing ends of the second connecting tongues (24) of the second friction lining member (12) having a mutual angular offset from each other with respect to a plane perpendicular to the center axis (C);

the first connection tongues (22) and second connecting tongues (24) are arranged so that each one of the first connection tongues (22) is axially aligned with one of the second connecting tongues (24) in the direction of the center axis (C).

8. The friction device (10) according to claim 7, wherein the first friction lining member (11) comprises a first annular support (16) and a first annular friction lining (13) fixed to the first support (16) and the second friction lining member (12) comprises a second annular support (18) and a second annular friction lining (14) fixed to the second support (18); and wherein the first fixing end (22A) of each of the first connecting tongues (22) is made in one piece with the first support (16) and the first fixing end (24A) of each of the second connecting tongues (24) is made in one piece with the second support (18).

9. The friction device (10) according to claim 1, further comprising elastic means (19) for axial bracing of the first (11) and second (12) friction lining members.

10. The friction device (10) according to claim 9, wherein the elastic bracing means (19) comprise an elastomeric member (20) generally annular in shape and arranged between the first (11) and second (12) friction lining members.

11. The friction device (10) according to claim 9, wherein the bracing means (19) comprise elastic bracing tongues (28) each provided with a first end (28A) for fixing to one of the friction lining members (11) and a second end (28B) free from contact with the other one of the friction lining members (12), these bracing tongues (28) being bent so that their first (28A) and second (28B) ends are mutually offset axially.

12. The friction device (10) according to claim 11, wherein the elastic bracing tongues (28) are connected to only one of the friction lining members (11) carrying a lining intended to cooperate preferably with an axially movable pressure plate.

13. The friction device (10) according to claim 11, wherein the friction device comprises at least two bracing tongues (28) having different axial offsets between their first (28A) and second (28B) ends.

14. The friction device (10) according to claim 11, wherein the friction device comprises at least two bracing tongues (28) having different stiffnesses.

15. The friction device (10) according to claim 11, wherein it comprises at least one two bracing tongues (28, 30), referred to as matched tongues, connected respectively to the first (11) and second (12) friction lining members.

16. The friction device (10) according to claim 15, wherein the matched bracing tongues (28, 30) are substantially symmetrical with respect to a plane parallel to the first (11) and second (12) friction lining members.

17. The friction device (10) according to claim 15, wherein the matched bracing tongues (28, 30) are substantially symmetrical with respect to a point.

18. The friction device (10) according to claim 17, wherein the symmetry point is a point of contact between the matched bracing tongues (28, 30).

19. The friction device (10) according to claim 15, wherein the matched bracing tongues (28, 30) are provided mutual contact surfaces (28C, 30C), the contact surface (28C, 30C) on one matched tongue (28, 30) being opposite the friction lining member (11, 12) to which it is connected.

20. The friction device (10) according to claim 15, wherein the matched bracing tongues (28, 30) are provided with mutual contact surfaces (28C, 30C), the contact surface (28C, 30C) on one matched tongue (28, 30) being opposite the friction lining (11, 12) to which it is not connected.

21. The friction device (10) according to claim 11, wherein the first connecting tongues (22) and the bracing tongues (28) extend from their first end (22A, 28A) to their second end (22B, 28B) respectively in identical circular directions.

22. The friction device (10) according to claim 1, wherein the distance between the first (22A; 24A) and second (22B; 24B) fixing ends on each of the connecting tongues (22; 24) is between 20 and 40 mm.

23. The friction device (10) according to claim 1, wherein at least one of the friction lining members (11, 12) comprises a support (16, 18) carrying a friction lining (13, 14).

24. The friction device (10) according to claim 23, wherein the friction lining (13, 14) is adhesively bonded to the support (16, 18).

25. The friction device (10) according to claim 1, wherein at least one friction lining member is formed as an injection moulded single piece part.

26. A friction device for a clutch of a motor vehicle, comprising:

first and second friction lining members coaxial to a center axis thereof, separated axially and delimited by opposite friction faces; and connection means connecting the first and second friction lining members fixed together;

the first friction lining member having a generally annular shape;

the connection means comprising first connection tongues each provided with a first fixing end fixed to an internal contour of the first friction lining member and a second fixing end fixed to the second friction lining member;

the first and second fixing end being variably angularly offset from each other with respect to a plane perpendicular to the center axis as a function of the axial separation of the first and second friction lining members so that the first friction lining member moving with respect to the second friction lining member by a simultaneous combination of a rotation on the center axis and a translation parallel to the center axis as a function of the axial separation of the first and second friction lining members.

27. A friction device for a clutch of a motor vehicle, comprising:

first and second friction lining members coaxial to a center axis (C) thereof, separated axially and delimited by opposite friction faces; and connecting means connecting the first and second friction lining members fixed together;

each of the first and second friction lining members having a generally annular shape;

the connection means comprising:

first connection tongues each provided with a first fixing end fixed to an internal contour of the first friction lining member and a second fixing end fixed to the second friction lining member, the first connection tongues being bent so that their first and second fixing ends are mutually offset axially in the direction of the center axis (C), the first fixing end and the second fixing end having an angular offset with respect to the center axis in a plane perpendicular to the center axis;

second connection tongues each provided with a first fixing end fixed to an internal contour of the second friction ling member and a second fixing end fixed to the second fixing end of the corresponding first connection tongue of the first friction lining member, the second connecting tongues not being axially bent;

the first and second fixing ends being variably angularly offset from each other with respect to the plane perpendicular to the center axis as a function of the axial separation of the first and second friction lining members.

* * * * *